(12) United States Patent
Teres Teres et al.

(10) Patent No.: US 8,677,810 B2
(45) Date of Patent: Mar. 25, 2014

(54) METHODS FOR MONITORING WIND TURBINES

(75) Inventors: Javier Teres Teres, Sarriguren (ES); Roberto Gutierrez Ardanaz, Sarriguren (ES); Millan Esteban Cornejo, Madrid (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 0 days.

(21) Appl. No.: 13/639,212

(22) PCT Filed: Apr. 11, 2011

(86) PCT No.: PCT/ES2011/000108
§ 371 (c)(1),
(2), (4) Date: Oct. 4, 2012

(87) PCT Pub. No.: WO2011/128470
PCT Pub. Date: Oct. 20, 2011

(65) Prior Publication Data
US 2013/0025352 A1 Jan. 31, 2013

(30) Foreign Application Priority Data
Apr. 13, 2010 (ES) .................................. 201000471

(51) Int. Cl.
*G01M 15/14* (2006.01)
(52) U.S. Cl.
USPC ....................................................... 73/112.01

(58) Field of Classification Search
USPC .................................................. 73/66, 112.01
See application file for complete search history.

(56) References Cited

U.S. PATENT DOCUMENTS

| 7,342,323 | B2 * | 3/2008 | Avagliano et al. ............... 290/55 |
| 7,823,437 | B2 * | 11/2010 | Siebers et al. .................. 73/1.37 |
| 8,219,356 | B2 * | 7/2012 | Mihok et al. .................... 702/182 |
| 8,546,968 | B2 * | 10/2013 | Wakasa et al. ................... 290/44 |
| 2007/0075546 | A1 | 4/2007 | Avagliano et al. |
| 2008/0307853 | A1 | 12/2008 | Siebers et al. |
| 2009/0299780 | A1 | 12/2009 | Sarkar et al. |

* cited by examiner

*Primary Examiner* — Freddie Kirkland, III
(74) *Attorney, Agent, or Firm* — Ladas & Parry LLP

(57) ABSTRACT

Monitoring method of a variable speed wind turbine (11) comprising control means for a pitch regulation tracking a power vs. generator speed curve (21) in function of the wind speed expressed by a transfer function (TF) applied to the wind speed measured by a wind sensor placed in a location where the wind flow is disturbed, that comprises the following steps: a) providing an optimum relationship function (F1) between a wind speed dependant variable (V) such as the blade pitch angle, and a wind turbine performance variable (P) such as the generator speed; b) measuring continuously said variables (V, P) and obtaining a relationship function (F2) between them; c) obtaining continuously a parameter (D) indicative of the differences between said relationship functions (F1, F2); d) generating a warning message when the value of said parameter (D) is greater than a predetermined value.

6 Claims, 2 Drawing Sheets

METHODS FOR MONITORING WIND TURBINES

RELATED APPLICATION INFORMATION

This application is a 371 of International Application PCT/ES2011/000108 filed 11 Apr. 2011 entitled "Method for Monitoring Wind Turbines", which was published on 20 Oct. 2011, with International Publication Number WO 2011/128470 A1, and which claims priority from Spanish Patent Application P201000471 filed 13 Apr. 2010, the content of which is incorporated herein by reference.

FIELD OF THE INVENTION

The invention relates to wind turbine monitoring methods and, more in particular, to monitoring methods of the wind speed Transfer Function.

BACKGROUND

Wind turbines are devices that convert energy from the wind to electrical energy. A typical wind turbine includes a nacelle mounted on a tower housing, a drive train for transmitting the rotation of a rotor to an electric generator and other components such as a yaw drive which orientates the wind turbine, several actuators and sensors and a brake. The rotor supports a number of blades extending radially therefrom for capturing the kinetic energy of the wind and causing the driving train rotational motion. The rotor blades have an aerodynamic shape such that when a wind blows across the surface of the blade, a lift force is generated causing the rotation of a shaft which is connected—directly or through a gearing arrangement—to the electrical generator located inside the nacelle. The amount of energy produced by wind turbines is dependent on the rotor blade sweeping surface that receives the action from the wind and consequently increasing the length of the blades leads normally to an increase of the power output of the wind turbine.

Under known control methods, the power produced by a wind turbine increases with wind speed until a rated nominal power output is reached and then it is maintained constant. In pitch regulated wind turbines, this is done regulating the pitching action of the blades in order to optimize power capture independently of the wind speed.

The wind speed is therefore an important control parameter for the operation of variable speed wind turbines. In many of the already installed wind turbines, the wind speed used by the wind turbine control system is the wind speed calculated applying a Transfer Function (hereinafter TF) to the wind speed measured by an anemometer located on the wind turbine nacelle.

The TF is defined as the function that expresses free stream wind speed as a function of wind speed measured by the wind sensor used by the wind turbine control system. This function is expected to correct the effect of the wind turbine rotor and flow distortion around the wind turbine. The TF depends on the wind turbine characteristics, on the wind sensor location and model, and on the wind characteristics in the wind turbine location.

As the wind flow around the nacelle is disturbed by the wind turbine rotor and the nacelle, it is very important to apply the appropriate TF to correct the flow distortion.

In order to obtain the appropriate TF, the free wind speed in front of the wind turbine rotor must be measured (using a cup or sonic anemometer installed on a meteorological mast, or a remote sensor of wind speed or by other means, including site calibration if necessary) and the wind speed measured by the wind turbine anemometer. The correlation function obtained, after an appropriate data analysis and corrupted data rejection, shall be applied to the data given by the wind turbine anemometer, in order to obtain the real wind speed in front of the wind turbine rotor.

A known method for obtaining an appropriate TF for a wind turbine without measuring the free wind speed in front of the wind turbine is the anemometer calibration method disclosed is US 2008/0307853 that comprises the steps of obtaining pairs of measured values of wind speed and a wind-speed dependent wind turbine variable, comparing said measured value pairs to pairs of wind speed and the turbine variable obtained from an expected turbine variable curve of the wind turbine to determine a difference between a measured wind speed value and an expected wind speed value for a given wind turbine variable value, and adjusting a calibration function of said anemometer on the basis of said determined difference.

Even though it is known the relevance of using an appropriate TF for optimizing the wind turbine power production, among the known monitoring methods for evaluating different aspects of the wind turbine performance, there is not known any specific method for monitoring the TF applied to a wind turbine.

This invention is addressed to the solution of said problem using known control means so that it can be implemented in the already installed wind turbines.

SUMMARY OF THE INVENTION

It is an object of the present invention to provide a monitoring method of the performance of a pitch controlled wind turbine.

It is another object of the present invention to provide a monitoring method of the TF applied to a pitch controlled wind turbine.

These and other objects are met by providing a monitoring method of a variable speed wind turbine comprising control means for a pitch regulation tracking a power vs. generator speed curve in function of the wind speed expressed by a TF applied to the wind speed measured by a wind sensor placed in a location where the wind flow is disturbed, comprising the following steps:

a) Providing an optimum relationship function F1 between a wind speed dependant variable V and a wind turbine performance variable P.

b) Measuring continuously said wind speed dependant variable V and said wind turbine performance variable P and obtaining a relationship function F2 between them.

c) Obtaining continuously a parameter D indicative of the differences between said relationship functions F1, F2.

d) Generating a warning message when the value of said parameter D is greater than a predetermined value.

In a preferred embodiment, in said step b) said relationship function F2 is obtained using averaged values of said variables V, P in periods of at least 10 minutes. Hereby it is achieved a method that assures that the data used for obtaining said relationship function F2 are not influenced by temporal fluctuations.

In another preferred embodiment in that said step c) said parameter D is obtained for the differences between said relationship functions F1, F2 in a pre-determined range of values of one of said variables V, P. Hereby it is achieved a method to be applied only to a selected range of one of said variables where it is to be expected a better detection of said differences.

In another preferred embodiment said wind speed dependant variable V is the blade pitch angle and said wind turbine performance variable P is the generator speed. Hereby it is achieved a method that uses a pair of variables particularly relevant for showing the differences between said relationship functions F1, F2 because, in particular, there is a significant range of wind speeds where the blade pitch angle shall remain constant (statistical 10-minute averages) in optimum performance conditions allowing therefore an easy detection of deviations when an inappropriate TF is used or when the wind turbine is subject to another problem.

In another preferred embodiment, the TF implemented in the wind turbine control means is a pre-validated TFv. Hereby it is achieved a suitable method for detecting wind turbine different problems than using an inappropriate TF.

Other features and advantages of the present invention will be understood from the following detailed description in relation with the enclosed drawings.

DETAILED DESCRIPTION OF PREFERRED EMBODIMENTS

Figure 1:
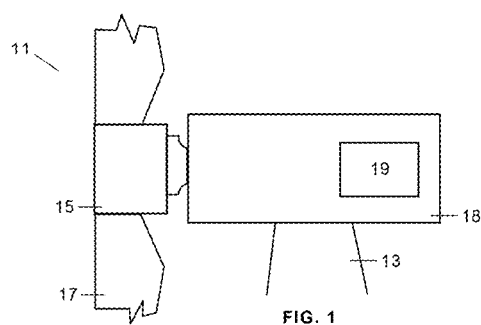
FIG. 1 shows schematically the main components of a wind turbine.

A typical wind turbine 11 comprises a tower 13 supporting a nacelle 18 housing a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the rotor 15 to the generator 19 and increase the shaft speed in order to achieve a suitable rotational speed of the generator rotor.

The power output from a modern wind turbine is typically controlled by means of a control system for regulating the pitch angle of the rotor blades and the generator torque. The rotor rotational speed and power output of the wind turbine can hereby be initially controlled e.g. before a transfer to a utility grid through a converter. We will refer in this description to a common blade pitch angle for all the rotor blades but the skilled man will readily appreciate that this invention is also applicable to wind turbines having individual means for controlling the pitch angle of each rotor blade.

The basic aim of the methods of operation of variable speed wind turbines is to achieve an operation at the ideal aerodynamic output for as much time as possible.

As it is known, the kinetic energy associated with the incoming wind depends on the area swept by the rotor blades, on the air density and on the cube of the wind speed and it is considered that wind turbines can extract up to 59% of this energy. Accordingly, the capacity of each wind turbine to approach this limit is represented by the so-called power coefficient Cp which is determined by its aerodynamic characteristics, particularly by its tip-speed ratio $\lambda$ which is defined as the relationship between the tangential speed of the blade tip and the speed of the incident wind. If this ratio is kept at its optimal value, so that the rotor speed follows the wind speed, the maximum power coefficient Cp of the wind turbine is obtained, achieving an extremely efficient energy conversion.

The control strategy generally used in variable speed wind turbines is based on electrically adjusting the generator's torque to achieve the maximum output and this is carried out using a controller which receives signals indicating the speed of the generator and the power produced by the generator and which provides a torque reference signal to the converter to obtain the required power.

Accordingly, the wind turbine controller uses a curve which defines the desired functional relationship between power and speed to achieve ideal output.

Figure 2:
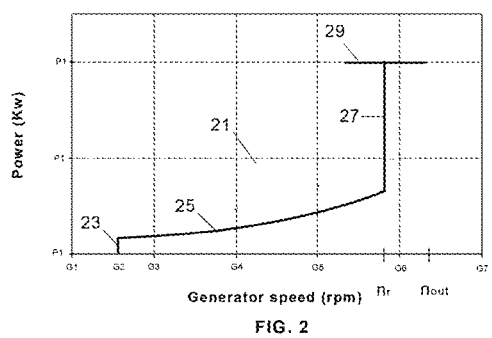
FIG. 2 shows a prior art Power vs. Generator speed curve used for controlling a variable speed wind turbine.

For a better understanding of the present invention a brief description of a typical prior art power vs. generator speed curve 21, shown in FIG. 2, follows.

This curve comprises a first sub-nominal zone 23 where the wind speed attains the minimum level for starting the wind turbine operation. In this zone, the wind turbine control is limited since the wind turbine can not capture the maximum energy. The second sub-nominal zone 25 corresponds to low wind speeds, where generator speed increases and the turbine is running with optimum power coefficient Cp. The third sub-nominal zone 27 corresponds to medium wind speeds where the generator speed is kept constant at the nominal generator speed nr1 while power increases up to the nominal power. Within this zone the pitch angle is fixed and generator speed is controlled via torque. At the nominal zone 29 the full load wind turbine operation at nominal power takes place under pitch control to avoid overloads.

Figure 3:
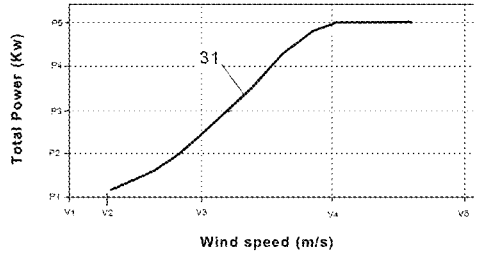
FIG. 3 shows a typical Power vs. Wind speed curve.

In ideal conditions, the resulting average power curve will be curve 31 in FIG. 3 but if the TF does not provide a correct value for the free stream wind speed there will be energy losses with respect to the ideal energy output.

The TF initially applied to a wind turbine is usually a TF obtained in a different wind turbine position than the working wind turbine position. The TF depends on, among other variables, the wind conditions (turbulence intensity, vertical component of the wind speed) and the wind turbine site topographic features. As those variables can vary from one wind turbine position to another wind turbine position even at a distance of a few meters between them, it may happen that the TF initially applied to a wind turbine is not the most appropriate for its site with the consequence that the wind turbine performance would be below the optimum level.

The basic idea of this invention is providing a TF monitoring method based on the relationship between one wind speed dependant variable V and one wind turbine performance dependant variable P. When the TF does not estimate correctly the wind speed in front of the rotor, the relationship between said variables V, P is not optimum. Therefore, it can be monitored whether the wind turbine is working with the appropriate TF or not comparing the expected values of said variables V, P with the measured values of said variables V, P from the wind turbine.

Suitable V variables are the following: wind speed, blade pitch angle, or any other variable related with the wind speed measured by the wind sensor.

Suitable P variables are the following: generator speed, output power, torque, rotor speed or any other variable related with the wind turbine performance.

In a preferred embodiment of this invention it has been found that the pair blade pitch angle as the wind speed dependant variable V and generator speed as the wind turbine performance dependant variable P is particularly suitable for detecting TF deviations.

Figure 4:
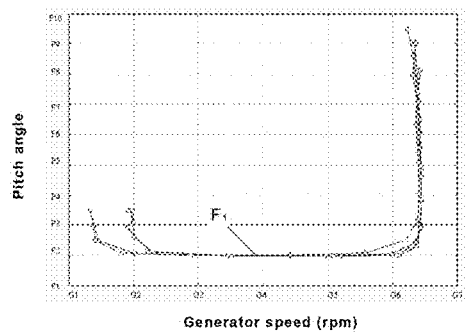
FIG. 4 shows an optimum relationship function F1 between the blade pitch angle speed and the generator speed in the wind turbine being monitored.

The first step of a monitoring method according to a preferred embodiment of the present invention is therefore providing an optimum relationship function F1 (i.e. a relationship under an appropriate TF) between blade pitch angle and generator speed, such as the function F1 illustrated in FIG. 4.

Said function F1 is obtained as the function between said variables resulting from a theoretical behaviour of the wind turbine. As it can be easily noted the function F1 of FIG. 4 and the power vs. generator speed curve 21 of FIG. 2 show different views of a theoretical wind turbine behaviour.

Figure 5:
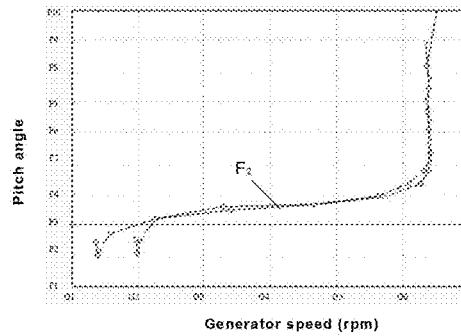
FIG. 5 shows the relationship function F2 between the blade pitch angle and the generator speed obtained in the wind turbine in operation being monitored.

In the second step of a monitoring method according to the present invention, the values of blade pitch angle and generator speed are continuously measured and a relationship function F2 between them is obtained such as the function F2 of FIG. 5 (which illustrates a relationship under an inappropriate TF).

The values of blade pitch angle and generator speed shall be measured as frequently as possible, typically 1 Hz, and averaged values, i.e. 10-minutes averaged values, are calculated. These averaged values of both variables blade pitch angle and generator speed are used to get the function F2.

The above-mentioned functions F1 and F2 shall be understood within this invention in wide sense including for example sets of pairs of blade pitch angle and generator speed values and mathematical functions obtained by a regression analysis of said data.

In the third step of a monitoring method according to the present invention, a parameter D indicative of the differences between said functions F1, F2 is continuously obtained using conventional mathematical tools and filtered data after eliminating non significant values.

Said parameter D can be obtained as an averaged value for a predetermined period (for example one hour or one day) which is also suitable for trend analysis.

Said parameter D can also be obtained for a predetermined range of values, for example, in reference to FIGS. 4 and 5, only for pairs of values with the generator speed between G3-G5 where it shall be expected to find a clear difference between F1 and F2 when the wind turbine is using an inappropriate TF. Said difference can be easily appreciated graphically comparing FIGS. 4 and 5. The expected value for the blade pitch angle has a constant value P2 while its real value, when the wind turbine is using an inappropriate TF, is higher than P3.

In the four step of a monitoring method according to the present invention, a warning message is generated when the value of said parameter D is greater than a predetermined value to be established for each wind turbine model.

After the detection of a relevant difference between said functions F1, F2, the TF should be corrected in order to maximize the wind turbine power performance according to any of the known methods mentioned in the Background.

It may happen that performing the monitoring method of this invention using a validated TFv there are still relevant differences between said functions F1, F2 due to reasons such as wind turbine misalignments or mechanical problems in the wind turbine. In this way, the monitoring method according to the present invention can be used for detecting said problems.

As the skilled man will readily understand, this method can be implemented in the wind turbine SCADA to monitor the wind turbine performance and send warning messages to warn that the wind turbine is not working in optimum conditions. The detection of this kind of problems can avoid a significant decrease in the wind turbine energy yield.

Although the present invention has been fully described in connection with preferred embodiments, it is evident that modifications may be introduced within the scope thereof, not considering this as limited by these embodiments, but by the contents of the following claims.

The invention claimed is:

1. Monitoring method of a variable speed wind turbine (11) comprising control means for a pitch regulation tracking a power vs. generator speed curve (21) in function of the wind speed expressed by a transfer function (TF) applied to the wind speed measured by a wind sensor placed in a location where the wind flow is disturbed, characterized in that it comprises the following steps:
   a) providing an optimum relationship function (F1) between a wind speed dependant variable (V) and a wind turbine performance variable (P);
   b) measuring continuously said wind speed dependant variable (V) and said wind turbine performance variable (P) and obtaining a relationship function (F2) between them;
   c) obtaining continuously a parameter (D) indicative of the differences between said relationship functions (F1, F2);
   d) generating a warning message when the value of said parameter (D) is greater than a predetermined value.

2. Monitoring method of a variable speed wind turbine (11) according to claim 1, characterized in that in said step b) said relationship function (F2) is obtained using averaged values of said variables (V, P) in periods of at least 10 minutes.

3. Monitoring method of a variable speed wind turbine (11) according to claim 1, characterized in that in said step c) said parameter (D) is obtained for the differences between said relationship functions (F1, F2) in a pre-determined range of values of one of said variables (V, P).

4. Monitoring method of a variable speed wind turbine (11) according to claim 1, characterized in that said wind speed dependant variable (V) is the blade pitch angle and said wind turbine performance variable (P) is the generator speed.

5. Monitoring method of a variable speed wind turbine (11) according to claim 1, characterized in that the transfer function (TF) implemented in the wind turbine control means is a pre-validated transfer function (TFv).

6. A variable speed wind turbine (11) monitored by a monitoring method according to claim 1.

* * * * *